(12) United States Patent
Takebayashi et al.

(10) Patent No.: US 11,958,528 B2
(45) Date of Patent: Apr. 16, 2024

(54) VEHICLE CONTROL APPARATUS AND VEHICLE CONTROL METHOD

(71) Applicant: SUBARU CORPORATION, Tokyo (JP)

(72) Inventors: Yosuke Takebayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 176 days.

(21) Appl. No.: 17/476,117

(22) Filed: Sep. 15, 2021

(65) Prior Publication Data

US 2022/0089219 A1     Mar. 24, 2022

(30) Foreign Application Priority Data

Sep. 24, 2020   (JP) ................................. 2020-159244

(51) Int. Cl.
*B62D 15/02* (2006.01)
(52) U.S. Cl.
CPC ................................. *B62D 15/025* (2013.01)
(58) Field of Classification Search
None
See application file for complete search history.

(56) References Cited

U.S. PATENT DOCUMENTS

| 2020/0317219 | A1* | 10/2020 | Yoshida | B62D 15/0255 |
| 2021/0294333 | A1* | 9/2021 | Jing | B62D 15/021 |
| 2021/0323606 | A1* | 10/2021 | Namba | B62D 6/002 |
| 2023/0244237 | A1* | 8/2023 | Jing | G05D 1/0276 |
| | | | | 701/25 |

FOREIGN PATENT DOCUMENTS

JP     2010-126077 A    6/2010

* cited by examiner

*Primary Examiner* — Jeff A Burke
*Assistant Examiner* — Jerrod Irvin Davis
(74) *Attorney, Agent, or Firm* — Rimon P.C.

(57) ABSTRACT

A vehicle control apparatus includes at least one processor and at least one memory communicably coupled to the processor. The processor sets a target steering angle every predetermined cycle, on the basis of a curvature radius of a first arc passing through a current position of a vehicle, and controls a steering angle on the basis of the target steering angle. The processor sets the target steering angle by obtaining a second arc passing through the current position and tangent to a traveling direction of the vehicle, on the basis of a sum of minimum distances to the first arc from respective target points on a target path. The processor sets the target steering angle in a second cycle following a first cycle, before the vehicle reaches a position corresponding to the farthest one of the target points used for setting of the target steering angle in the first cycle.

20 Claims, 5 Drawing Sheets

VEHICLE CONTROL APPARATUS AND VEHICLE CONTROL METHOD

CROSS-REFERENCE TO RELATED APPLICATIONS

The present application claims priority from Japanese Patent Application No. 2020-159244 filed on Sep. 24, 2020, the entire contents of which are hereby incorporated by reference.

BACKGROUND

The technology relates to a vehicle control apparatus and a vehicle control method.

In recent years, techniques related to automatic driving of causing a vehicle to automatically travel regardless of a driver's driving operation have been put to practical use. The automatic driving performs control of causing a vehicle to travel along a target path. As an example of such techniques related to the automatic driving, Japanese Unexamined Patent Application Publication (JP-A) No. 2010-126077 proposes a travel assistance apparatus that suppresses lane departure of a vehicle, while achieving smooth steering feel. For example, JP-A No. 2010-126077 discloses a travel assistance apparatus that repeats the following: calculating two or more correction amounts to reduce lateral deviations between a target location on a target path and two or more traveling locations on a traveling path along which the vehicle is expected to travel from now; and correcting a steering state of the vehicle on the basis of the calculated correction amounts.

SUMMARY

An aspect of the technology provides a vehicle control apparatus including one or more processors and one or more memories. The one or more memories are communicably coupled to the one or more processors. The one or more processors are configured to set a target steering angle every predetermined cycle, on the basis of a curvature radius of a first arc passing through a current position of a vehicle, and control a steering angle on the basis of the target steering angle. The one or more processors are configured to set the target steering angle by obtaining a second arc passing through the current position of the vehicle and tangent to a traveling direction of the vehicle, on the basis of a sum of minimum distances to the first arc from respective target points set on a target path. The one or more processors are configured to set the target steering angle in a second cycle subsequent to a first cycle, before the vehicle reaches a position corresponding to the farthest target point, out of the target points used for setting of the target steering angle in the first cycle.

An aspect of the technology provides a vehicle control method including: setting a target steering angle every predetermined cycle, on the basis of a curvature radius of a first arc passing through a current position of a vehicle; and controlling a steering angle on the basis of the target steering angle. The setting the target steering angle includes setting the target steering angle by obtaining a second arc passing through the current position of the vehicle and tangent to a traveling direction of the vehicle, on the basis of a sum of minimum distances to the first arc from respective target points set on a target path, and setting the target steering angle in a second cycle subsequent to a first cycle, before the vehicle reaches a position corresponding to the farthest target point, out of the target points used for setting of the target steering angle in the first cycle.

An aspect of the technology provides a vehicle control apparatus including circuitry. The circuitry is configured to set a target steering angle every predetermined cycle, on the basis of a curvature radius of a first arc passing through a current position of a vehicle, and control a steering angle on the basis of the target steering angle. The circuitry is configured to set the target steering angle by obtaining a second arc passing through the current position of the vehicle and tangent to a traveling direction of the vehicle, on the basis of a sum of minimum distances to the first arc from respective target points set on a target path. The circuitry is configured to set the target steering angle in a second cycle subsequent to a first cycle, before the vehicle reaches a position corresponding to the farthest target point, out of the target points used for setting of the target steering angle in the first cycle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

The travel assistance apparatus disclosed in JP-A No. 2010-126077 determines, in each computation cycle, a traveling path approximated as a plurality of arcs to reduce lateral deviations, between a plurality of target points and the actual traveling path, and sets a target steering angle on the basis of the nearest arc. However, in a case where the traveling path is determined by using the plurality of arcs, a difference in curvature between the arcs can increase, causing a steering angle to change abruptly. In a case of attempting to suppress such an abrupt change in the steering angle, it may be necessary to evaluate a steering speed together with the lateral deviations. This can increase computational complexity, and lead to an increase in load on a control apparatus.

It is desirable to provide a vehicle control apparatus and a vehicle control method that make it possible to achieve a smooth traveling path, while suppressing an increase in computational complexity in setting a target steering angle in each computation cycle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale.

Throughout the present specification and the drawings, elements having substantially the same function and configuration are denoted with the same numerals to avoid any redundant description.

[1. Example Configuration of Vehicle]

Described first is an example configuration of a vehicle mountable with a vehicle control apparatus according to an example embodiment of the technology.

Figure 1:
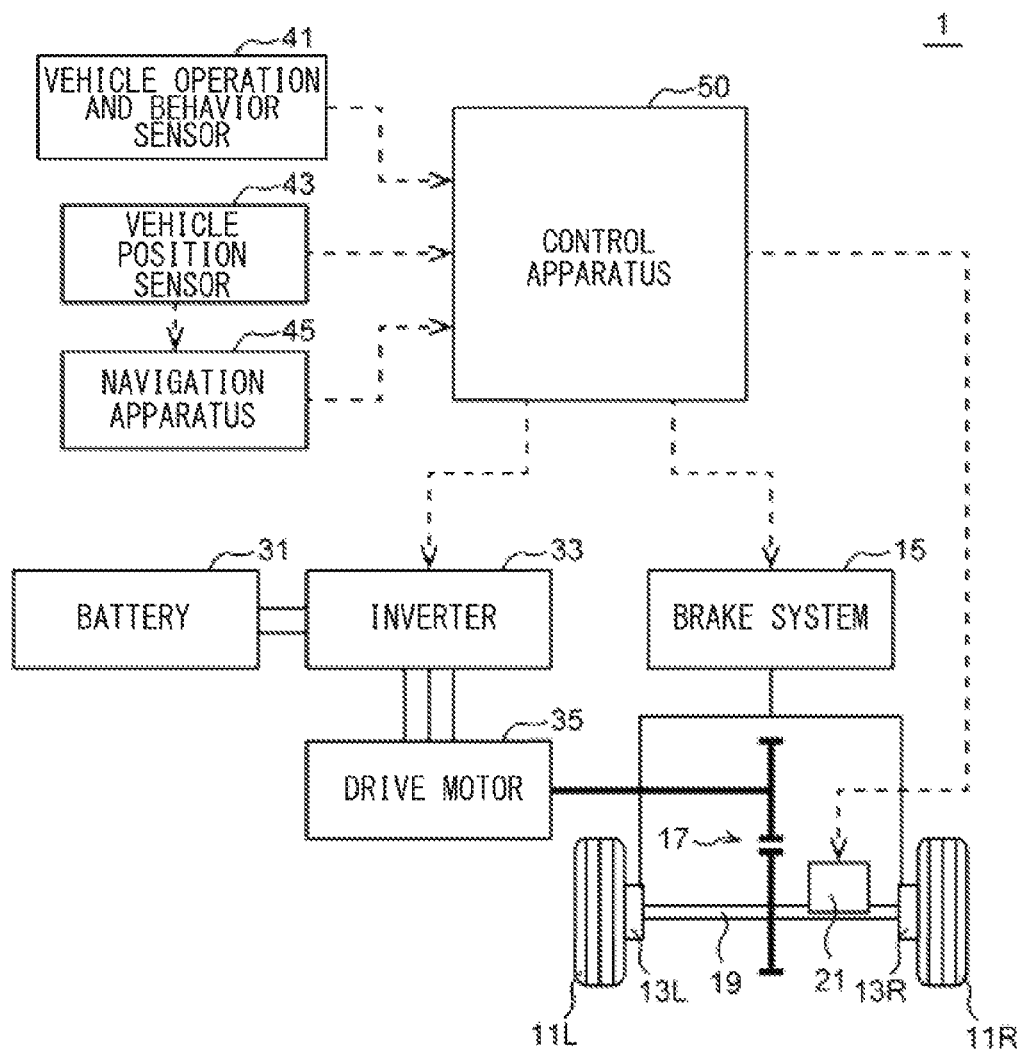
FIG. 1 is a schematic diagram illustrating an example configuration of a vehicle mountable with a vehicle control apparatus according to one example embodiment of the technology.

FIG. 1 is a schematic diagram illustrating an example configuration of a vehicle 1. The vehicle 1 may include wheels 11L and 11R, a motive power transmission system 17, a drive motor 35, an inverter 33, a battery 31, a brake system 15, an electric steering system 21, a vehicle operation and behavior sensor 41, a vehicle position sensor 43, a navigation apparatus 45, and a control apparatus 50. The inverter 33, the brake system 15, the electric steering system 21, the vehicle operation and behavior sensor 41, the vehicle position sensor 43, and the navigation apparatus 45 may each be coupled to the control apparatus 50 in a direct manner or in an indirect manner via a communication system such as a controller area network (CAN) or a local interconnect network (LIN).

The vehicle 1 illustrated in FIG. 1 may be an electric vehicle that includes only the drive motor 35 as a driving source, and travels by using motive power outputted from the drive motor 35. The vehicle 1 may have a driving mode switchable between a manual driving mode and an automatic driving mode. The manual driving mode may be a driving mode in which acceleration and deceleration rates and a steering angle of the vehicle 1 are controlled in response to a driver's driving operation. The automatic driving mode may be a driving mode in which the acceleration and deceleration rates and the steering angle of the vehicle 1 are controlled automatically regardless of the driver's driving operation.

The driving mode may be switchable by the driver. The driving mode may be switched to the automatic driving mode by intervention of the control apparatus 50 during the manual driving mode. The driving mode may be switched from the automatic driving mode to the manual driving mode in a case where a specific operation, such as a braking operation, is performed by the driver during the automatic driving mode.

The drive motor 35 may be a motor that outputs motive power to be transmitted to the wheels 11L and 11R of the vehicle 1. A three-phase alternating-current (AC) motor may be used as the drive motor 35, for example. The drive motor 35 may be coupled to the battery 31 via the inverter 33. The drive motor 35 may output motive power by being driven by electric power supplied from the battery 31.

Note that the drive motor 35 may be a motor configured to be regeneratively driven while the vehicle 1 is decelerating, to generate electric power by using kinetic energy of the wheels 11L and 11R. In this case, the battery 31 may be charged with the electric power generated by the drive motor 35, via the inverter 33.

The drive motor 35 may have an output shaft coupled, via the motive power transmission system 17, to a drive shaft 19 to which the wheels 11L and 11R are coupled. Thus, the motive power outputted from the drive motor 35 may be transmitted to the wheels 11L and 11R via the motive power transmission system 17 and the drive shaft 19.

The wheels 11L and 11R illustrated in FIG. 1 may be front wheels whose steering angle is controlled by the electric steering system 21, and the motive power outputted from the drive motor 35 may be transmitted to at least the front wheels. Note that the wheels 11L and 11R that receive the motive power outputted from the drive motor 35 may be rear wheels. In another example, the motive power outputted from the drive motor 35 may be transmitted to both the front wheels and the rear wheels via an unillustrated propeller shaft.

The inverter 33 may be an electric power converter that performs bidirectional electric power conversion. For example, the inverter 33 may include a three-phase bridge circuit. The inverter 33 may convert direct-current (DC) electric power supplied from the battery 31 into AC electric power, and supply the AC electric power to the drive motor 35. The inverter 33 may also convert AC electric power generated by the drive motor 35 into DC electric power, and supply the DC electric power to the battery 31. Driving of the inverter 33 may be controlled by the control apparatus 50.

The battery 31 may be a battery configured to be charged with electric power and to discharge electric power. For example, a lithium ion battery, a lithium ion polymer battery, a nickel metal hydride battery, a nickel-cadmium battery, or a lead-acid battery may be used as the battery 31. Examples of the battery 31 are not limited thereto. The battery 31 may store electric power to be supplied to the drive motor 35.

The brake system 15 may control braking force to be applied to the wheels 11L and 11R by, for example, controlling hydraulic pressure to be supplied to brake mechanisms 13L and 13R provided for the respective wheels 11L and 11R. The brake system 15 may include, for example, an unillustrated master cylinder, servo unit, and hydraulic control unit. The master cylinder may be coupled to a brake pedal via the servo unit. The servo unit may boost brake pedal effort by the driver, and transmit the boosted brake pedal effort to the master cylinder.

The master cylinder may be coupled to the brake mechanisms 13L and 13R via a hydraulic circuit provided in the hydraulic control unit. The master cylinder may supply working fluid to the hydraulic circuit in response to an amount of operation on the brake pedal. The hydraulic control unit may include an electromagnetic control valve and an electric pump, and may control a flow rate of the working fluid to be supplied to the brake mechanisms 31L and 31R.

The brake mechanisms 13L and 13R for the respective wheels 11L and 11R may each include, for example, a brake caliper including a pair of brake pads and a wheel cylinder. The pair of brake pads may be provided to face respective sides of a brake disc that rotates integrally with the corresponding one of the wheels 11L and 11R. The wheel cylinder may be a hydraulic chamber provided in the brake caliper. In conjunction with an increase in pressure in the wheel cylinder, the brake pads may move toward the respective sides of the brake disc. The brake disc may thus be held by the pair of brake pads, causing braking force to be applied to the corresponding one of the wheels 11L and 11R by friction force.

The hydraulic control unit may control the flow rate of the working fluid to be supplied to the brake mechanisms 13L and 13R. Thus, the pressure in the wheel cylinder of each of the brake mechanisms 13L and 13R may be adjusted, enabling control of the braking force to be applied to the wheels 11L and 11R. Driving of the brake system 15 may be controlled by the control apparatus 50.

The electric steering system 21 may assist the driver's steering operation on a steering wheel. For example, the electric steering system 21 may include a rotation sensor and an electric motor. The rotation sensor may detect a rotation angle of the unillustrated steering wheel. The electric motor may control the steering angle of the wheels 11L and 11R in response to the rotation angle of the steering wheel detected by the rotation sensor. The electric steering system 21 may further include an electric motor configured to output motive power that rotates the steering wheel. Driving of the electric steering system 21 may be controlled by the control apparatus 50.

In the automatic driving mode, the electric steering system 21 may be used to control the steering angle of the wheels 11L and 11R.

The vehicle operation and behavior sensor 41 may include one or more sensors that detect an operation state and a behavior of the vehicle. For example, the vehicle operation and behavior sensor 41 may include one or more of a vehicle speed sensor, an acceleration rate sensor, and an angular speed sensor. The vehicle operation and behavior sensor 41 may thus detect information on the behavior of the vehicle, such as a vehicle speed, a longitudinal acceleration rate, a lateral acceleration rate, or a yaw rate. for example, the vehicle operation and behavior sensor 41 may include one or more of an accelerator position sensor, a brake stroke sensor, a brake pressure sensor, a steering angle sensor, and an engine revolution number sensor. The vehicle operation and behavior sensor 41 may thus detect information on the operation state of the vehicle, such as a steering angle of the steering wheel or steered wheels, an accelerator position, or an amount of braking operation. The vehicle operation and behavior sensor 41 may transmit a sensor signal including the detected information to the control apparatus 50.

The vehicle position sensor 43 may detect a position of the vehicle 1, and output a detection result to the control apparatus 50. For example, the vehicle position sensor 43 may be a global positioning system (GPS) sensor that receives satellite signals from GPS satellites. The GPS sensor may transmit, to the navigation apparatus 45 and the control apparatus 50, position information of the vehicle on map data included in the received satellite signal. In place of the GPS sensor, an antenna may be provided to receive satellite signals from another satellite system that identifies the position of the vehicle.

The vehicle position sensor 43 may further include measuring equipment configured to detect the position of the own vehicle on a road, such as a vehicle outside imaging camera, a light detection and ranging or laser imaging detection and ranging (LiDAR), or a radar sensor.

The navigation apparatus 45 may be an apparatus that guides a traveling route from the current position of the vehicle 1 to a set destination. The navigation apparatus 45 may have map data stored therein in advance. The map data may include data on a target path that is a traveling path serving as a reference for the vehicle 1 in the automatic driving mode to travel on each road. For example, the data on the target path may be data on a center line, in a vehicle width direction, of a traveling lane, and may be configured as data on a target point group. The traveling lane may refer to a lane on which the vehicle 1 is traveling. The navigation apparatus 45 may acquire information on the current position of the vehicle 1 outputted from the vehicle position sensor 43, and set the traveling route from the current position to the set destination. The navigation apparatus 45 may transmit information indicating the traveling route and the target path to the control apparatus 50.

The navigation apparatus 45 may also be configured to visually display information. The navigation apparatus 45 may display, on the map data, various pieces of information related to route guidance, including the current position and the traveling route of the vehicle 1, a position of the destination, a distance to the destination, and expected arrival time.

The control apparatus 50 may execute, during the automatic driving mode of the vehicle 1, automatic driving control of controlling the inverter 33, the brake system 15, and the electric steering system 21 to cause the vehicle 1 to automatically travel along the traveling route set by the navigation apparatus 45. The control apparatus 50 at least sets a target steering angle of the wheels 11L and 11R, and controls the steering angle of the wheels 11L and 11R on the basis of the target steering angle. The control apparatus 50 may also be referred to as the "vehicle control apparatus 50".

[2. Control Apparatus]

The vehicle control apparatus 50 according to the example embodiment will now be described in detail.

[2-1. Example Configuration]

The control apparatus 50 at least includes one or more processors and one or more memories communicably coupled to the one or more processors. Examples of the one or more processors may include a central processing unit (CPU) and a micro-processing unit (MPU). The one or more memories may store various pieces of data. Note that a portion or the entirety of the control apparatus 50 may be an updatable software such as a firmware, or a program module to be executed in response to a command from the CPU, for example.

Figure 2:
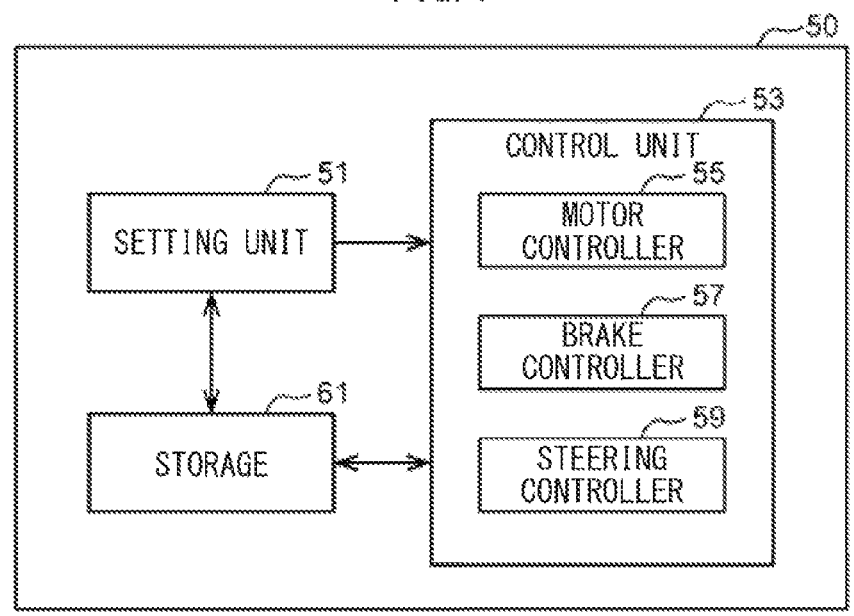
FIG. 2 is a block diagram illustrating an example configuration of the vehicle control apparatus according to one example embodiment.

FIG. 2 is a block diagram illustrating an example configuration of the control apparatus 50. The control apparatus 50 may include a setting unit 51, a control unit 53, and a storage 61. Elements of the control apparatus 50 according to the example embodiment may be implemented by one control apparatus, or by a plurality of control apparatuses configured to communicate with each other via a communication system such as a CAN.

[2-1-1. Storage]

The storage 61 may include a memory. Examples of the memory may include a read only memory (ROM) and a random access memory (RAM). The ROM may store a program to be executed by the processor and various computation parameters to be used in a computation process. The RAM may store various detection data acquired by the processor and a computation result, for example. The storage 61 may include a storage medium, such as a hard disk drive (HDD), a compact disc (CD), a digital versatile disk (DVD), a solid state drive (SSD), a universal serial bus (USB) flash drive, or a storage device.

[2-1-2. Setting Unit]

The setting unit 51 may set, during the automatic driving mode of the vehicle 1, a target steering angle θt of the wheels 11L and 11R to cause the vehicle 1 to travel along a target path Ttgt on the traveling route acquired from the navigation apparatus 45. In the example embodiment, the setting unit 51 may set a predetermined arc At, on the basis of the current position Pa of the vehicle 1 outputted from the vehicle position sensor 43, and a plurality of target points P1 to P5 set on the target path Ttgt acquired from the navigation apparatus 45, and set the target steering angle θt on the basis of a curvature radius r of the arc At. In one embodiment, the arc At may serve as a "first arc". The setting unit 51 may set the target steering angle θt every predetermined computation cycle set in advance in accordance with, for example, a processing speed of the processor.

Instead of acquiring data on the target path Ttgt from the navigation apparatus 45, the setting unit 51 may calculate, as the target path Ttgt, the center line of the traveling lane on the basis of data outputted from a vehicle outside imaging camera or a sensor that detects a surrounding environment of the vehicle, for example.

[2-1-3. Control Unit]

The control unit 53 may execute various computation processes by executing the program stored in the storage 61, to control operation of each unit of the vehicle 1. In the example embodiment, the control unit 53 may include a motor controller 55, a brake controller 57, and a steering controller 59.

The motor controller 55 may control the operation of the drive motor 35. In one example, the motor controller 55 may control the electric power supply from the battery 31 to the drive motor 35 and the charging of the battery 31 with the electric power generated by the drive motor 35, by controlling the operation of a switching device of the inverter 33. This enables the motor controller 55 to control the output of the motive power and the charging of the battery 31 by the drive motor 35.

The brake controller 57 may control the operation of the brake system 15. In one example, the brake controller 57 may control the pressure in the wheel cylinder of each of the brake mechanisms 13L and 13R for the respective wheels 11L and 11R, by controlling the operation of the hydraulic control unit. This enables the brake controller 57 to control the braking force to be applied to the vehicle 1.

The steering controller 59 may control the operation of the electric steering system 21. In one example, the steering controller 59 may control a steering angle θ of the wheels 11L and 11R, by controlling output of the electric motor of the electric steering system 21. The steering controller 59 may be configured to control at least the steering angle θ of the wheels 11L and 11R. The steering controller 59 may also control the rotation angle of the steering wheel in association with the steering angle θ of the wheels 11L and 11R.

The driving mode of the vehicle 1 may be switchable between the manual driving mode and the automatic driving mode, as described above. The control unit 53 may control, in accordance with the driving mode, the acceleration and deceleration rates and the steering angle of the vehicle 1.

For example, in the manual driving mode, the control unit 53 may control each unit to make the acceleration and deceleration rates of the vehicle 1 correspond to an acceleration operation and a braking operation performed by the driver. In one example, the control unit 53 may control the operation of the drive motor 35 to make driving force to be applied to the vehicle 1 correspond to the accelerator position. This makes it possible to control the acceleration rate of the vehicle 1 in response to the acceleration operation performed by the driver. The control unit 53 may also control the operation of the brake system 15 to make the braking force to be applied to the vehicle 1 correspond to the amount of braking operation. This makes it possible to control the deceleration rate of the vehicle 1 in response to the braking operation performed by the driver. While a steering operation by the driver is being performed, the control unit 53 may control the operation of the electric motor to make the steering angle θ of the wheels 11L and 11R correspond to the rotation angle of the steering wheel. This makes it possible to control the steering angle θ of the wheels 11L and 11R in response to the driver's steering operation.

In the automatic driving mode, the control unit 53 may control each unit to cause the vehicle 1 to automatically travel along the traveling route set by the navigation apparatus 45. In one example, the control unit 53 may control each unit to cause the vehicle 1 to automatically travel along the target path Ttgt on the traveling route acquired from the navigation apparatus 45. The control unit 53 may control the operation of the electric steering system 21 to make the steering angle θ of the wheels 11L and 11R become the target steering angle θt set by the setting unit 51. The control unit 53 may also control the acceleration and deceleration rates of the vehicle 1, for example, to keep a vehicle speed V of the vehicle 1 at a set speed. The control unit 53 may set a control target for each unit every computation cycle. The computation cycle may be, for example, the same as that of the setting unit 51.

In a case where a preceding vehicle is present ahead of the vehicle 1, or a pedestrian or an obstacle, for example is present around the vehicle 1, the control unit 53 may adjust the traveling path or the vehicle speed of the vehicle 1 to avoid contact of the vehicle 1 with the preceding vehicle and the pedestrian, for example. Note that, for easy understanding of the technology, the following description is given assuming that a preceding vehicle and a pedestrian, for example, are absent.

[2-2. Example Operation of Control Apparatus]

Description is given next on an example of a process of controlling the steering angle θ of the wheels 11L and 11R by the control apparatus 50, as an example operation of the vehicle control apparatus 50 according to the example embodiment.

[2-2-1. Reference Example]

Figure 3:
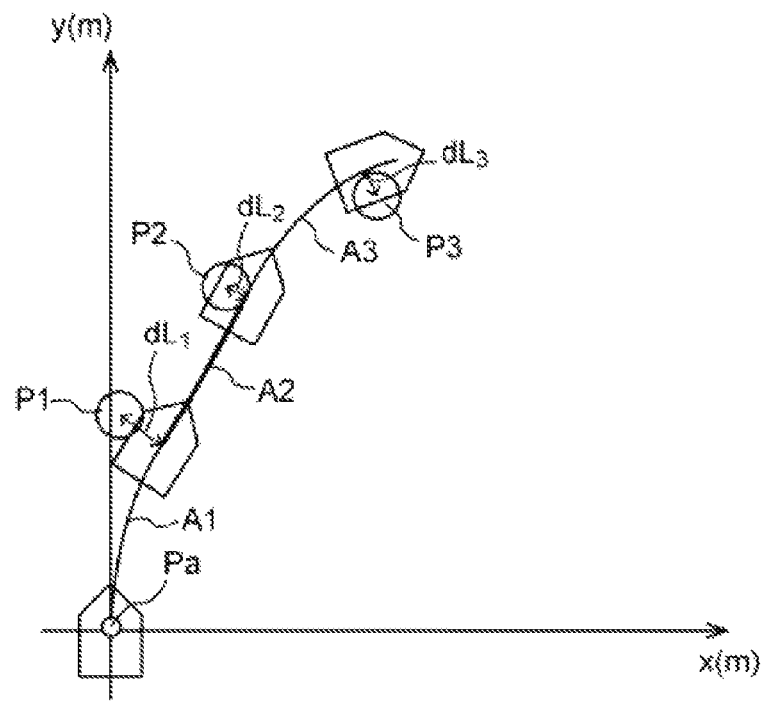
FIG. 3 is an explanatory diagram illustrating a traveling path to be set according to a reference example.
Figure 4:
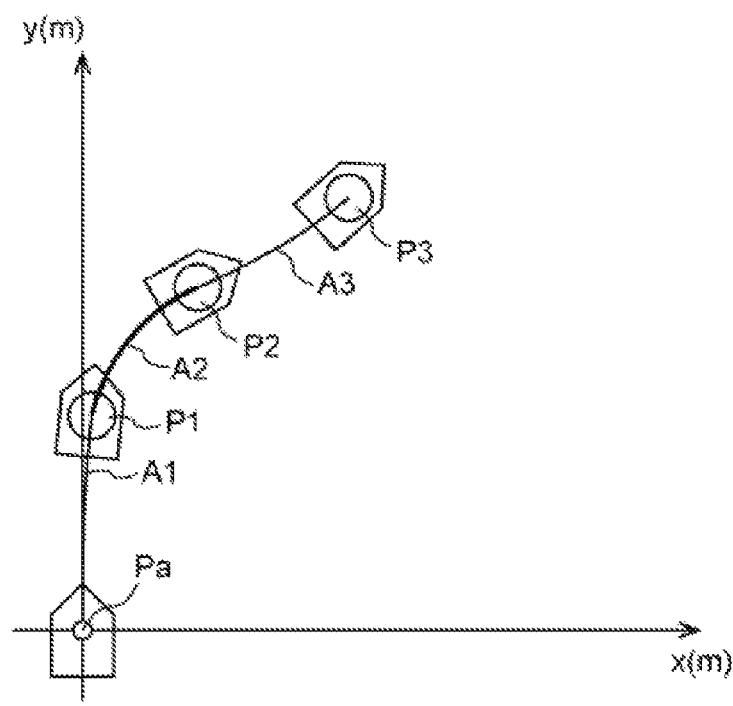
FIG. 4 is an explanatory diagram illustrating a traveling path to be set without considering a steering speed in the reference example.

Before describing a method of setting the target steering angle θt according to the example embodiment, description is given on examples in a case of causing a vehicle to travel by automatic driving on the basis of a target steering angle set according to a reference example, with reference to FIG. 3 and FIG. 4.

FIG. 3 and FIG. 4 illustrate examples of repeating, on a time-series basis, setting the target steering angle by approximating the traveling path of the vehicle as a plurality of arcs A1 to A3. The arcs A1 to A3 are set for respective target points P1 to P3 set on a target path. Three target points are set in the examples of FIG. 3 and FIG. 4. The traveling path is approximated by using an evaluation function that may reflect lateral deviations $dL_1$ to $dL_3$ from the respective target points P1 to P3. A lateral deviation $dL_1$ refers to an error in the vehicle width direction between each target point and the traveling path of the vehicle. In this case, a position of the vehicle may be determined on the basis of any reference. For example, the reference may be the center of gravity of the vehicle or the center position of the vehicle.

FIG. 3 illustrates an example of setting the traveling path of the vehicle by using an evaluation function set to reflect a steering speed when the driver operates the steering wheel, together with the lateral deviations $dL_1$ to $dL_3$ from the respective target points P1 to P3. In the example illustrated in FIG. 3, at the current position Pa of the vehicle, the traveling path that minimizes the evaluation function is calculated by being approximated as the plurality of arcs A1 to A3 corresponding to the respective target points P1 to P3, and the target steering angle is set on the basis of the nearest arc A1.

The evaluation function may be expressed by, for example, the following expression.

$$\text{evaluation function} = \text{sum } X \text{ of lateral deviations} \times \text{coefficient } \alpha + \text{sum } \Omega \text{ of steering speeds} \times \text{coefficient } \beta$$

FIG. 4 illustrates an example of setting the traveling path without considering the steering speed in the example illustrated in FIG. 3. As illustrated in FIG. 4, in a case where an evaluation function that reflects only the lateral deviations $dL_1$ to $dL_3$ from the respective target points P1 to P3 is used, without considering the steering speed, a difference in curvature between the obtained arcs A1 to A3 can increase, causing the steering speed to change abruptly. Accordingly, in a case of setting the target steering angle by approximating the traveling path of the vehicle as the plurality of arcs to reduce the lateral deviations $dL_1$ to $dL_3$ from the respective target points P1 to P3, it may be necessary to use the evaluation function that may reflect the steering speed as well as the lateral deviations $dL_1$ to $dL_3$ from the respective target points P1 to P3, as in the example illustrated in FIG. 3. This can increase computational complexity in each computation cycle, and lead to an increase in load on a control apparatus.

[2-2-2. Method of Setting Target Steering Angle According to Example Embodiment]

Description will now be given on an overview of a method of setting the target steering angle θt by the setting unit 51 of the control apparatus 50 according to the example embodiment.

In the control apparatus 50 according to the example embodiment, the setting unit 51 may acquire the information on the current position Pa of the vehicle 1 transmitted from the vehicle position sensor 43, and acquire the information on the target path Ttgt on the traveling route outputted from the navigation apparatus 45. The setting unit 51 sets one arc At tangent to the current traveling direction of the vehicle 1 and passing through the current position Pa of the vehicle 1. In one embodiment, the one arc At may serve as a "second arc". The setting unit 51 may set the target steering angle θt of the wheels 11L and 11R to cause the vehicle 1 to travel along the obtained arc At. For example, the setting unit 51 may set the target steering angle θt on the basis of the curvature radius r of the calculated arc At and the current vehicle speed V of the vehicle 1. In a case of causing the vehicle 1 to travel on the same arc At, the target steering angle θt may be set to a larger value as the vehicle speed V is higher, because centrifugal force increases with an increase in the vehicle speed V.

In the control apparatus 50 according to the example embodiment, the setting unit 51 may set a plurality of target points Pi on the target path Ttgt, and obtain one arc At to be used for setting of the target steering angle θt, on the basis of the sum of minimum distances from these respective target points Pi to an arc At. As the sum of the minimum distances from the respective target points Pi to the arc At is smaller, it is possible to make the obtained arc At pass nearer to the target path Ttgt within a calculation range in which the target points Pi are set this time. This makes it possible to make the actual traveling path closer to the target path Ttgt. Accordingly, the setting unit 51 may, for example, obtain one arc At (e.g., the second arc) that minimizes the sum of the minimum distances from these respective target points Pi to an arc At (e.g., the first arc). Setting the arc At that minimizes the sum of the minimum distances makes it possible to set the arc At nearest to the target path Ttgt within this calculation range. This makes it possible to make the traveling path of the vehicle 1 closer to the target path Ttgt.

In the setting of the arc At, the setting unit 51 may assign weights to minimum distances $dL_1$ for the respective target points Pi, in a case of intending to cause the vehicle 1 to travel near to one or more target points Pi out of the plurality of target points Pi, or in a case of intending to cause the vehicle 1 to travel far from a specific target point Pi. This enables setting of the arc At that passes near to or far from the specific target point Pi and passes through a position near to the target path Ttgt within the calculation range in which the plurality of target points Pi are set, making it possible to set the target steering angle θt on the basis of the arc At.

The setting unit 51 may repeat setting the target steering angle θt in a second cycle subsequent to a first cycle before the vehicle 1 reaches a position corresponding to the target point farthest from the current position Pa, out of the plurality of target points Pi used for setting of the target steering angle θt in the first cycle. This makes it possible to suppress an increase in difference in curvature between the arcs At obtained in the respective computation cycles. Consequently, in obtaining the arc At to be used for setting of the target steering angle θt, it is possible to make the traveling path smooth without considering the steering speed. This makes it possible to reduce computational complexity at the control apparatus 50, and lessen load on the control apparatus 50.

Figure 5:
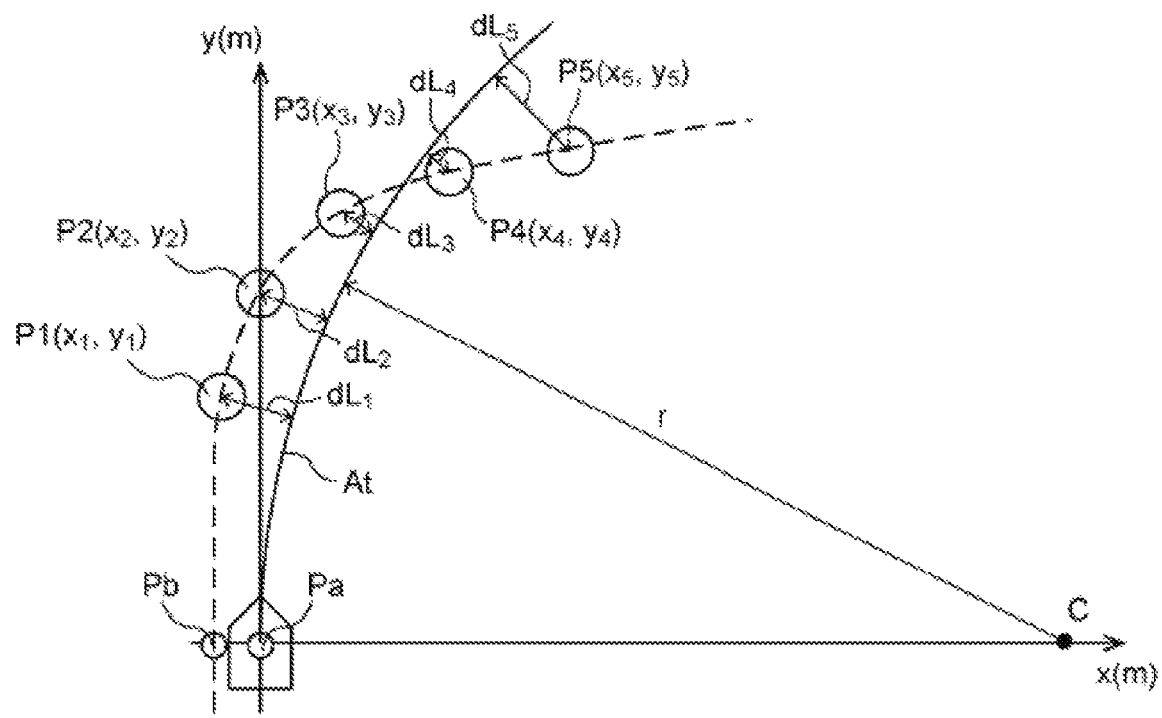
FIG. 5 is an explanatory diagram illustrating a method of calculating an arc according to one example embodiment.

FIG. 5 is an explanatory diagram illustrating a method of setting the plurality of target points Pi.

The setting unit 51 may set any target points Pi on the target path Ttgt acquired from the navigation apparatus 45. In the example illustrated in FIG. 5, five target points P1 to P5 may be set on the target path Ttgt. The number of target points Pi is not limited to five, and may be four or less or six or more. Note that it is possible to make the calculated arc At more analogous to the target path Ttgt as the number of target points Pi is larger. On the other hand, selecting too large a number of target points Pi results in long time taken for the computation process. The number of target points may be set with these taken into consideration, for example.

The target point P1 nearest to the current position Pa, out of the five target points P1 to P5, may be set, for example, at least before a position to be reached by the vehicle 1 by the next computation cycle. Thus, the target steering angle θt calculated in this computation cycle is reflected in a path along which the vehicle 1 is to travel by the next computation cycle. This makes it possible to suppress great deviation of the vehicle 1 from the target path Ttgt. In this case, if the current position Pa of the vehicle 1 is not present on the target path Ttgt, a starting point Pb may be set at a position, on the target path Ttgt, nearest to the current position Pa to serve as a substitute for the current position Pa. If the position to be reached by the vehicle 1 by the next computation cycle is not present on the target path Ttgt, a position, on the target path Ttgt, nearest to the position to be reached may serve as a substitute for the position to be reached.

The setting unit 51 may set a distance from the current position Pa (or the starting point Pb) to the target point P1 longer in proportion to the current vehicle speed V of the vehicle 1. Setting the distance from the current position Pa (or the starting point Pb) to the target point P1 in proportion to the vehicle speed V enables the plurality of target points Pi to be set in accordance with a distance reachable by the vehicle 1. The target steering angle θt to be set on the basis of the thus calculated arc At makes it possible to cause the vehicle 1 to travel without greatly deviating from the target path Ttgt.

Any positions may be selected as positions of the respective target points P1 to P5. For example, the positions of the target points P1 to P5 may be set at equal intervals. Each interval in this case may be set shorter than a distance assumed to be traveled by the vehicle 1 at an interval of the computation cycle. Setting the plurality of target points P1 to P5 at equal intervals makes it is possible to make the calculated arc At more analogous to the target path Ttgt. In a case of setting the target points P1 to P5 at equal intervals, the interval between the target points P1 to P5 may be set larger in proportion to the current vehicle speed V of the vehicle 1. In one example, the interval between the target points P1 to P5 may be set to be larger as the current vehicle speed V of the vehicle 1 is higher. Setting the interval between the target points P1 to P5 in proportion to the vehicle speed V enables the plurality of target points Pi to be set in accordance with the distance reachable by the vehicle 1. The target steering angle θt to be set on the basis of the thus calculated arc At makes it possible to cause the vehicle 1 to travel without greatly deviating from the target path Ttgt.

In a case where the vehicle speed V of the vehicle 1 falls below a predetermined threshold set in advance, the setting unit 51 may calculate the arc At with the interval between the plurality of target points Pi fixed at a predetermined minimum value or greater, and set the target steering angle θt. Thus, in a case where the vehicle speed V is low, it is possible to suppress an increase in difference in curvature between the arcs At calculated in the respective computation cycles caused by the arc At being calculated in an excessively short range. Consequently, it is possible to suppress an abrupt change in the steering speed. In addition, in a case where a lateral deviation dL between the target path Ttgt and the actual traveling path occurs, it may be necessary to set the target points Pi up to a distance that allows the lateral deviation dL to be corrected. Accordingly, the interval between the plurality of target points Pi may be set to a value equal to or greater than a lower limit to make a distance to the farthest target point out of the plurality of target points Pi equal to or greater than a predetermined distance. This makes it possible to prevent, in a case where a lateral deviation dL occurs, the lateral deviation dL from being uncorrectable.

For example, a threshold of the vehicle speed V at which the interval between the target points Pi becomes the lower limit may be set, and the interval between the target points Pi may be set larger in proportion to the vehicle speed V in a range within which the vehicle speed V of the vehicle 1 is equal to or greater than the threshold. In addition, in a case where the vehicle speed V falls below the threshold, the setting unit 51 may keep the interval set in the computation cycle immediately before the vehicle speed V falls below the threshold. Alternatively, the interval to be set in a case where the vehicle speed V falls below the threshold may be determined as a constant value in advance.

As illustrated in FIG. 5, the setting unit 51 may obtain the arc At passing through the current position Pa of the vehicle 1 and tangent to the traveling direction of the vehicle 1, on the basis of the sum of the minimum distances $dL_1$ to the arc At from the respective target points Pi set on the target path Ttgt. The setting unit 51 may obtain the arc At that minimizes the sum of the minimum distances $dL_1$ from the respective target points Pi to the arc At. This makes it possible to make the arc At most analogous to the target path Ttgt within the calculation range in which the target points Pi are set.

In the example embodiment, the setting unit 51 may use a least-squares method to obtain the curvature radius r of the arc At that minimizes the sum of the minimum distances $dL_1$ from the respective target points Pi to the arc At. For example, the setting unit 51 may obtain coordinates $(x_i, y_i)$, on a two-dimensional space, of each of the selected five target points P1 to P5. The two-dimensional space to be used may be, for example, a two-dimensional space whose origin is the current position Pa of the vehicle 1 and y-axis is the traveling direction of the vehicle 1. This facilitates calculation of the arc At that minimizes the sum of the minimum distances $dL_1$ from the respective target points Pi to the arc At.

Figure 6:
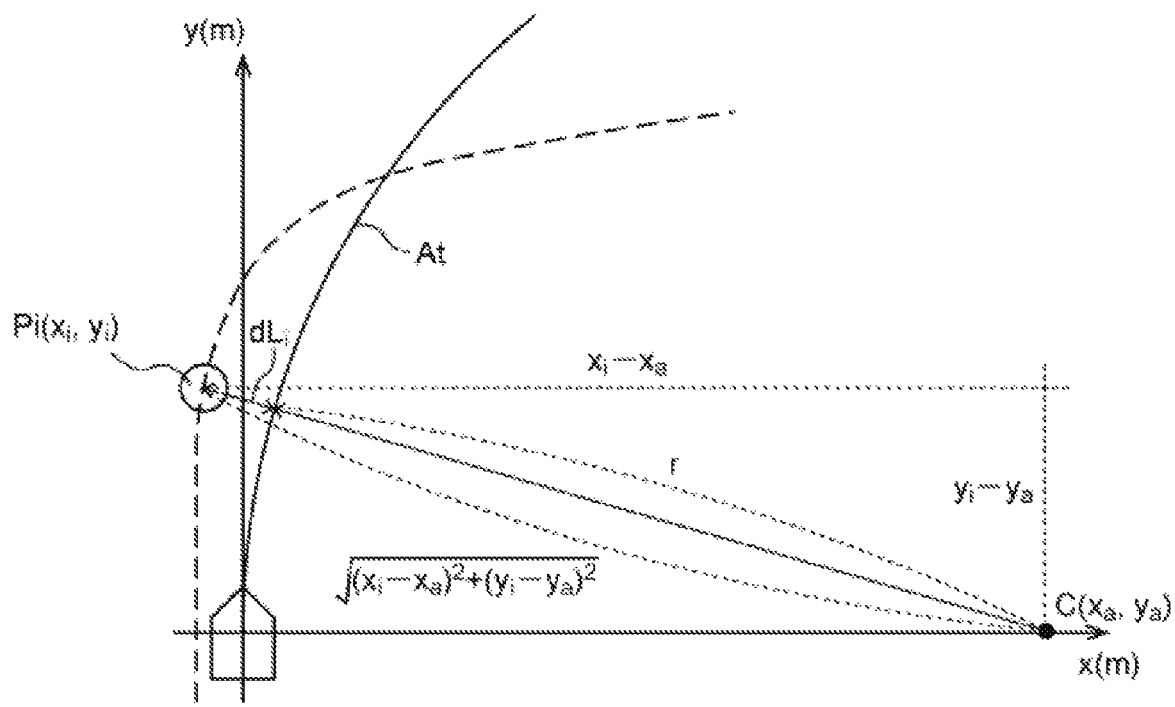
FIG. 6 is an explanatory diagram illustrating a method of calculating a minimum distance between a target point and an arc.

In one example, coordinates of a center C of a virtual arc may be denoted by $(x_a, y_a)$, and the curvature radius of the arc At may be denoted by "r", as illustrated in FIG. 6. Thus, a difference $S_i$ between the square of a distance from the center C of the virtual arc $(x_a, y_a)$ to the target point Pi $(x_i, y_i)$, and the square of the curvature radius r may be expressed by the following expression (1).

$$S_i = [(x_i - x_a)^2 + (y_i - y_a)^2] - r^2 \quad (1)$$

In a case of using the two-dimensional space whose origin is the current position Pa of the vehicle 1 and y-axis is the traveling direction of the vehicle 1, the coordinates of the center C of the virtual arc may be (r, 0). Accordingly, the difference $S_i$ described above may be expressed by the following expression (2).

$$S_i = [(x_i - r)^2 + y_i^2] - r^2 \quad (2)$$

Accordingly, the sum of the squares of the differences $S_i$ for all the target points Pi may be expressed by the following expression (3).

$$\sum_{i=1}^{n} S_i^2 = \sum_{i=1}^{n} \left( (x_i - r)^2 + y_i^2 - r^2 \right)^2 \quad (3)$$
$$= \sum_{i=1}^{n} \left( x_i^4 - 4x_i^3 r + 2x_i^2 y_i^2 + 4x_i^2 r^2 - 4x_i y_i^2 r + y_i^4 \right)$$

The above expression (3) may be differentiated, and the curvature radius r that makes the sum of the squares of the differences $S_i$ become 0 may be the curvature radius r of the arc At that minimizes the difference $S_i$, as expressed by the following expressions (4) and (5).

$$d\sum_{i=1}^{n} S_i^2 / dr = 4\sum_{i=1}^{n} x_i^3 + 8r\sum_{i=1}^{n} x_i^2 - 4\sum_{i=1}^{n} x_i y_i^2 = 0 \quad (4)$$

$$\text{arc radius } r = \sum_{i=1}^{n} x_i^3 + \sum_{i=1}^{n} x_i y_i^2 / n^2 / \sum_{i=1}^{n} 2x_i^2 \quad (5)$$

The setting unit 51 may calculate, every computation cycle, the target steering angle θt with which the vehicle 1 is able to travel on the arc At with the curvature radius r, by using the curvature radius r obtained on the basis of the above expression (5) and the current vehicle speed V of the vehicle 1. In a case of setting the target steering angle θt in this manner, only one arc At is to be obtained in each computation cycle, and only lateral deviations dL from the respective target points Pi are to be evaluated. This reduces computational complexity, making it possible to lessen the load on the control apparatus 50.

The setting unit 51 may repeat setting the target steering angle θt in the second cycle subsequent to the first cycle, before the vehicle 1 reaches the position corresponding to the farthest target point P5, out of the plurality of target points P1 to P5 used for setting of the target steering angle θt in the first cycle. In other words, at least the farthest target point P5, out of the plurality of target points P1 to P5, may be set farther than the nearest target point to be used in setting the target steering angle θt at the position to be reached by the vehicle 1 by the second cycle.

Figure 7:
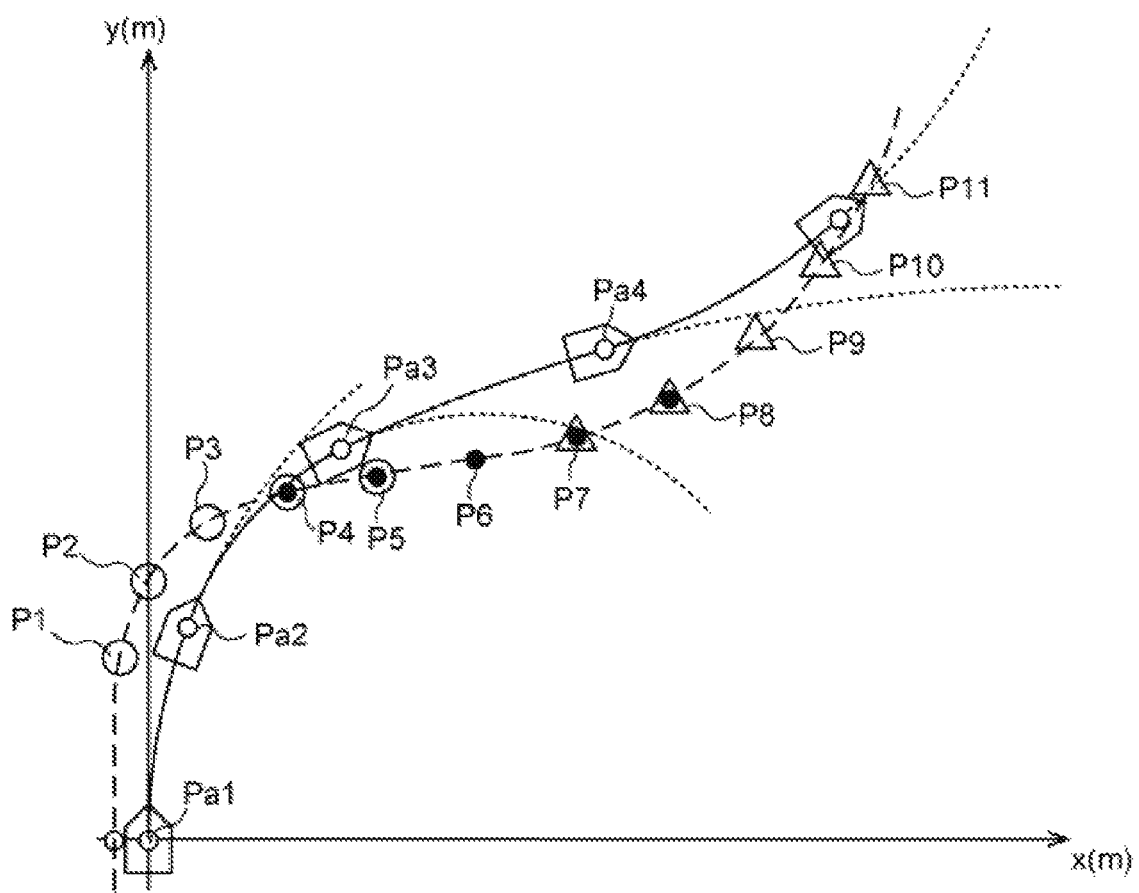
FIG. 7 is an explanatory diagram illustrating an arc to be set every computation cycle.

FIG. 7 is an explanatory diagram illustrating target points to be used for setting of the target steering angle θt in each computation cycle. In a case where the vehicle 1 is located at the current position Pa1, five target points P1 to P5 indicated by white circles may be used to calculate the arc At that minimizes the sum of the minimum distances $dL_1$ from the respective target points P1 to P5. In the next computation cycle, the vehicle 1 may be located at the current position Pa2, and five target points P4 to P8 indicated by black circles may be used to calculate the arc At that minimizes the sum of the minimum distances $dL_1$ from the respective target points P4 to P8. In the further next computation cycle, the vehicle 1 may be located at the current position Pa3, and five target points P7 to P11 indicated by triangles may be used to calculate the arc At that minimizes the sum of the minimum distances $dL_1$ from the respective target points P7 to P11.

The setting unit 51 may repeat the calculation of the arc At and the setting of the target steering angle θt every computation cycle in this manner. Thus, ranges of the arcs At obtained in consecutive computation cycles overlap each other, which suppresses an abrupt change in curvature of the arc At. This makes it possible to suppress an abrupt change in the target steering angle θt. This makes it unnecessary to evaluate the steering speed, which helps to reduce computational complexity.

For example, when the vehicle enters a curve with a curvature radius of 20 meters from a straight line at a vehicle speed V of 20 km/h, it is possible to cause the vehicle to travel on the arc At at a steering speed of 90 degrees/second or less, on the assumption that the target steering angle θt is calculated by setting a target point for each of four seconds ahead, i.e., four target points P1 to P4. This steering speed is equivalent to a steering speed when a person performs a steering operation. This makes it possible to achieve stable traveling even in a case where the steering speed is not evaluated.

[2-3. Steering Control Process]

Figure 8:
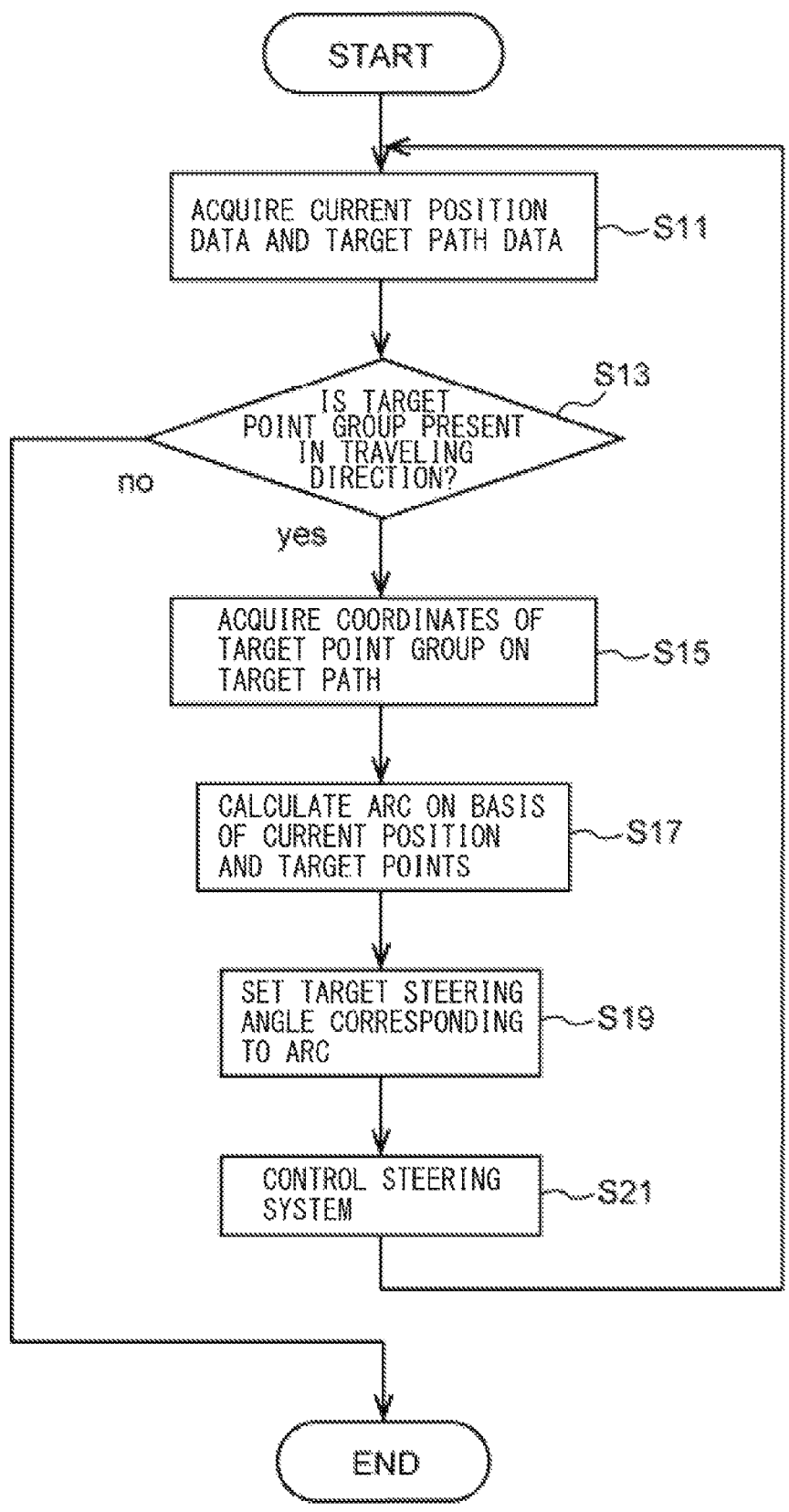
FIG. 8 is a flowchart illustrating a steering control process to be performed by the vehicle control apparatus according to one example embodiment.

Now, an example of a steering control process to be performed by the control apparatus 50 of the vehicle 1 will be described along a flowchart of FIG. 8.

First, the setting unit 51 may acquire, from the vehicle position sensor 43 and the navigation apparatus 45, data on the current position Pa of the vehicle 1 and data on the target path Ttgt (step S11). Thereafter, the setting unit 51 may determine whether a target point group configuring the target path Ttgt is present in the traveling direction of the vehicle 1 (step S13). In this step, it may be determined whether the vehicle 1 has been set to the automatic driving mode, and the vehicle 1 is being automatically driven along the traveling route in a state before reaching the destination. If a target point group is absent ("no" in step S13), the setting unit 51 may bring this routine to an end.

If a target point group is present ("yes" in step S13), the setting unit 51 may select a plurality of target points P1 to P5 from the target point group configuring the target path Ttgt, and obtain the coordinates ($x_i$, $y_i$) of the respective target points P1 to P5 on the two-dimensional space (step S15). As described above, it is possible to calculate the arc At closer to the target path Ttgt, in the range within which the target points P1 to P5 are set, as a larger number of target points are selected. Note that selecting too large a number of target points results in long time taken for the computation process. The number of target points may be set with these taken into consideration, for example.

The setting unit 51 may, for example, set the distance from the current position Pa (or the starting point Pb) to the nearest target point P1 and the interval between the plurality of target points Pi, in accordance with the current vehicle speed V of the vehicle 1. This enables the arc At to be set in an appropriate calculation range corresponding to the distance reachable by the vehicle 1. In a case where the vehicle speed V falls below a predetermined threshold, the setting unit 51 may, for example, fix the interval between the target points Pi at a predetermined minimum value or greater. This makes it possible to suppress an increase in difference in curvature between the arcs At set in the respective computation cycles. Note that the target path Ttgt may be calculated by the control apparatus 50. For example, the control apparatus 50 may use a path linking the center lines of the traveling lanes ahead in the traveling direction as the target path Ttgt, on the basis of data transmitted from the vehicle outside imaging camera or the sensor that detects the surrounding environment of the vehicle 1.

Thereafter, the setting unit 51 may calculate, on the basis of the sum of minimum distances $dL_1$ to $dL_5$ from the respective selected target points P1 to P5, the arc At tangent to the current traveling direction of the vehicle 1 and passing through the current position Pa of the vehicle 1 (step S17). For example, the setting unit 51 may calculate the arc At having the curvature radius r obtained by the least-squares method, by using the above expression (5). In the calculation, in a case of intending to cause the vehicle 1 to travel near to a specific target point Pi, or in a case of intending to cause the vehicle 1 to travel far from a specific target point Pi, the setting unit 51 may assign weights to the minimum distances $dL_1$ for the respective target points Pi.

Thereafter, the setting unit 51 may set the target steering angle θt of the wheels 11L and 11R to achieve a traveling path with the curvature of the calculated arc At (step S19). In one example, the setting unit 51 may calculate a steering angle in a case of causing the vehicle 1 to travel on the calculated arc At, and set the steering angle as the target steering angle θt. For example, the setting unit 51 may refer to a steering angle map defining the target steering angle θt to be set in accordance with the curvature radius r of the arc At and the vehicle speed V. The setting unit 51 may thus set the target steering angle θt on the basis of the curvature radius r of the obtained arc At and the current vehicle speed V of the vehicle 1. In a case of causing the vehicle 1 to travel on the same arc At, the target steering angle θt may be set to a larger value as the vehicle speed V is higher, because centrifugal force increases with an increase in the vehicle speed V.

Thereafter, the steering controller 59 of the control unit 53 may control the electric steering system 21 to make the steering angle of the wheels 11L and 11R become the target steering angle θt (step S21). The process may thereafter return to step S11, and the steps described above may be repeatedly executed.

[3. Example Effects of Control Apparatus According to Example Embodiment]

As described above, in the control apparatus 50 according to the example embodiment, the setting unit 51 sets the target steering angle θt, by calculating one arc At (e.g., the second arc) having a tangent along the traveling direction of the vehicle 1 and passing through the current position Pa of the vehicle 1, on the basis of the sum of the minimum distances between an arc At (e.g., the first arc) and the plurality of target points Pi set on the target path Ttgt. This makes it unnecessary to calculate a plurality of arcs corresponding to the respective target points Pi in each computation cycle, and also unnecessary to consider the steering speed. This reduces computational complexity, making it possible to lessen the load on the control apparatus 50.

The setting unit 51 may repeatedly execute setting the target steering angle θt in the second cycle subsequent to the first cycle, before the vehicle 1 reaches the position corresponding to the farthest target point, out of the plurality of target points Pi used for setting of the target steering angle θt in the first cycle. Thus, the setting is performed to make the arcs At calculated in the respective computation cycles partly overlap each other, which suppresses an abrupt change in the target steering angle θt. This helps to achieve a smooth traveling path.

The setting unit 51 may set the target steering angle θt, by calculating the arc At (e.g., the second arc) that minimizes the sum of the minimum distances between the arc At (e.g., the first arc) and the plurality of target points Pi set on the target path Ttgt. This makes it possible to make the arc At pass through the position nearest to the target path Ttgt within the calculation range in which the target points Pi are set in each computation cycle. This helps to make the actual traveling path closer to the target path Ttgt.

The setting unit 51 may set the plurality of target points Pi at equal intervals in accordance with the current vehicle speed V of the vehicle 1. This enables the arc At to be set within the calculation range corresponding to the distance reachable by the vehicle 1, making it possible to suppress great deviation of the traveling path of the vehicle 1 from the target path Ttgt. In a case where the vehicle speed V falls below a predetermined threshold, the setting unit 51 may fix the interval between the plurality of target points Pi at a predetermined minimum value or greater. This makes it possible to suppress an increase in difference in curvature between the arc Ats calculated in the respective computation cycles caused by the arc At being calculated in an excessively short range. This helps to suppress an abrupt change in the steering speed.

The setting unit 51 may obtain the arc At (e.g., the second arc) by assigning weights to the minimum distances from the respective target points Pi to the arc At (e.g., the first arc). This makes it possible to set the target steering angle θt on the basis of the arc At made nearer to or farther from a specific target point Pi. This helps to achieve traveling based on automatic driving considering the surrounding environment of the vehicle 1 and driving characteristics of the driver.

In the above description, some example embodiments and modification examples of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, although the above example embodiment describes the use of the least-squares method to calculate the arc At that minimizes the sum of the minimum distances from the respective target points Pi to the arc At, the technology is not limited to this example. The arc At that minimizes the sum of the minimum distances from the respective target points Pi to the arc At may be calculated by another appropriate method, without being limited to the least-squares method.

As described above, at least one embodiment of the technology makes it possible to achieve a smooth traveling path, while suppressing an increase in computational complexity in setting a target steering angle in each computation cycle.

Each of the setting unit 51 and the control unit 53 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the setting unit 51 and the control unit 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the setting unit 51 and the control unit 53 illustrated in FIG. 2.

The invention claimed is:

1. A vehicle control apparatus comprising:
   one or more processors
   the one or more processors being configured to:
      set a target steering angle every predetermined cycle, and
      control a steering angle of a vehicle on a basis of the target steering angle,
   wherein the target steering angle is set by, in each cycle of the predetermined cycle:
      acquiring a target path of the vehicle to be traveling and a current position of the vehicle,
      setting a plurality of target points on the target path,
      obtaining an arc passing through the current position of the vehicle and tangent to a traveling direction of the vehicle based on the plurality of target points, and
      setting the target steering angle based on a curvature radius of the arc,
      a first target steering angle is set based on a first curvature radius of a first arc in a first cycle, and a second target steering angle is set based on a second curvature radius of a second arc in a second cycle subsequent to the first cycle, and
      the second target steering angle is set in the second cycle before the vehicle reaches a position corresponding to the farthest target point, out of the plurality of target points used for setting the first target steering angle in the first cycle.

2. The vehicle control apparatus according to claim 1, wherein the one or more processors are configured to repeat the setting of the target steering angle to cause at least one target point, out of the plurality of target points used for the setting the first target steering angle in the first cycle, to be included in the plurality of target points to be used for the setting the second target steering angle in the second cycle.

3. The vehicle control apparatus according to claim 2, wherein the plurality of target points comprise target points to be reached, the target points to be reached being set at equal intervals in accordance with a vehicle speed of the vehicle.

4. The vehicle control apparatus according to claim 3, wherein the one or more processors are configured to fix each interval between the plurality of target points at a predetermined minimum value or greater, in a case where the vehicle speed of the vehicle falls below a predetermined threshold.

5. The vehicle control apparatus according to claim 4, wherein the one or more processors are configured to obtain, as the arc such that the sum of the minimum distances to the arc from the plurality of target points becomes minimum.

6. The vehicle control apparatus according to claim 5, wherein the one or more processors are configured to obtain the second arc by assigning weights to the minimum distances to the arc from the plurality of target points.

7. The vehicle control apparatus according to claim 3, wherein the one or more processors are configured to obtain, as the arc such that the sum of the minimum distances to the arc from the plurality of target points becomes minimum.

8. The vehicle control apparatus according to claim 7, wherein the one or more processors are configured to obtain the second arc by assigning weights to the minimum distances to the arc from the plurality of target points.

9. The vehicle control apparatus according to claim 2, wherein the one or more processors are configured to obtain, as the arc such that the sum of the minimum distances to the arc from the plurality of target points becomes minimum.

10. The vehicle control apparatus according to claim 9, wherein the one or more processors are configured to obtain the second arc by assigning weights to the minimum distances to the arc from the plurality of target points.

11. The vehicle control apparatus according to claim 1, wherein the plurality of target points comprise target points to be reached, the target points to be reached being set at equal intervals in accordance with a vehicle speed of the vehicle.

12. The vehicle control apparatus according to claim 11, wherein the one or more processors are configured to fix each interval between the plurality of target points at a predetermined minimum value or greater, in a case where the vehicle speed of the vehicle falls below a predetermined threshold.

13. The vehicle control apparatus according to claim 12, wherein the one or more processors are configured to obtain, as the arc such that the sum of the minimum distances to the arc from the plurality of target points becomes minimum.

14. The vehicle control apparatus according to claim 13, wherein the one or more processors are configured to obtain the second arc by assigning weights to the minimum distances to the arc from the plurality of target points.

15. The vehicle control apparatus according to claim 11, wherein the one or more processors are configured to obtain, as the arc such that the sum of the minimum distances to the arc from the plurality of target points becomes minimum.

16. The vehicle control apparatus according to claim 15, wherein the one or more processors are configured to obtain the second arc by assigning weights to the minimum distances to the arc from the plurality of target points.

17. The vehicle control apparatus according to claim 1, wherein the one or more processors are configured to obtain, as the arc such that the sum of the minimum distances to the arc from the plurality of target points becomes minimum.

18. The vehicle control apparatus according to claim 17, wherein the one or more processors are configured to obtain the arc by assigning weights to the minimum distances to the arc from the plurality of target points.

19. A vehicle control method comprising:
setting a target steering angle of a vehicle every predetermined cycle; and
controlling a steering angle on a basis of the target steering angle,
wherein the setting the target steering angle in each of the predetermined cycle includes
acquiring a target path of the vehicle to be traveling and a current position of the vehicle,
setting a plurality of target points on the target path,
obtaining an arc passing through the current position of the vehicle and tangent to a traveling direction of the vehicle based on the plurality of target points, and
setting the target steering angle based on a curvature radius of the arc, and
a first target steering angle is set based on a first curvature radius of a first arc in a first cycle, and a second target steering angle is set based on a second curvature radius of a second arc in a second cycle subsequent to the first cycle, and
the second target steering angle is set in the second cycle before the vehicle reaches a position corresponding to the farthest target point, out of the plurality of target points used for setting the first target steering angle in the first cycle.

20. A vehicle control apparatus comprising
circuitry configured to
set a target steering angle of a vehicle every predetermined cycle, and
control a steering angle on a basis of the target steering angle,
wherein the target steering angle is set by, in each cycle of the predetermined cycle:
acquiring a target path of the vehicle to be traveling and a current position of the vehicle,
setting a plurality of target points on the target path,
obtaining an arc passing through the current position of the vehicle and tangent to a traveling direction of the vehicle based on the plurality of target points, and
setting the target steering angle based on a curvature radius of the arc
a first target steering angle is set based on a first curvature radius of a first arc in a first cycle, and a second target steering angle is set based on a second curvature radius of a second arc in a second cycle subsequent to the first cycle, and
the second target steering angle is set in the second cycle before the vehicle reaches a position corresponding to the farthest target point, out of the plurality of target points used for setting the first target steering angle in the first cycle.

* * * * *